Patented Jan. 29, 1952

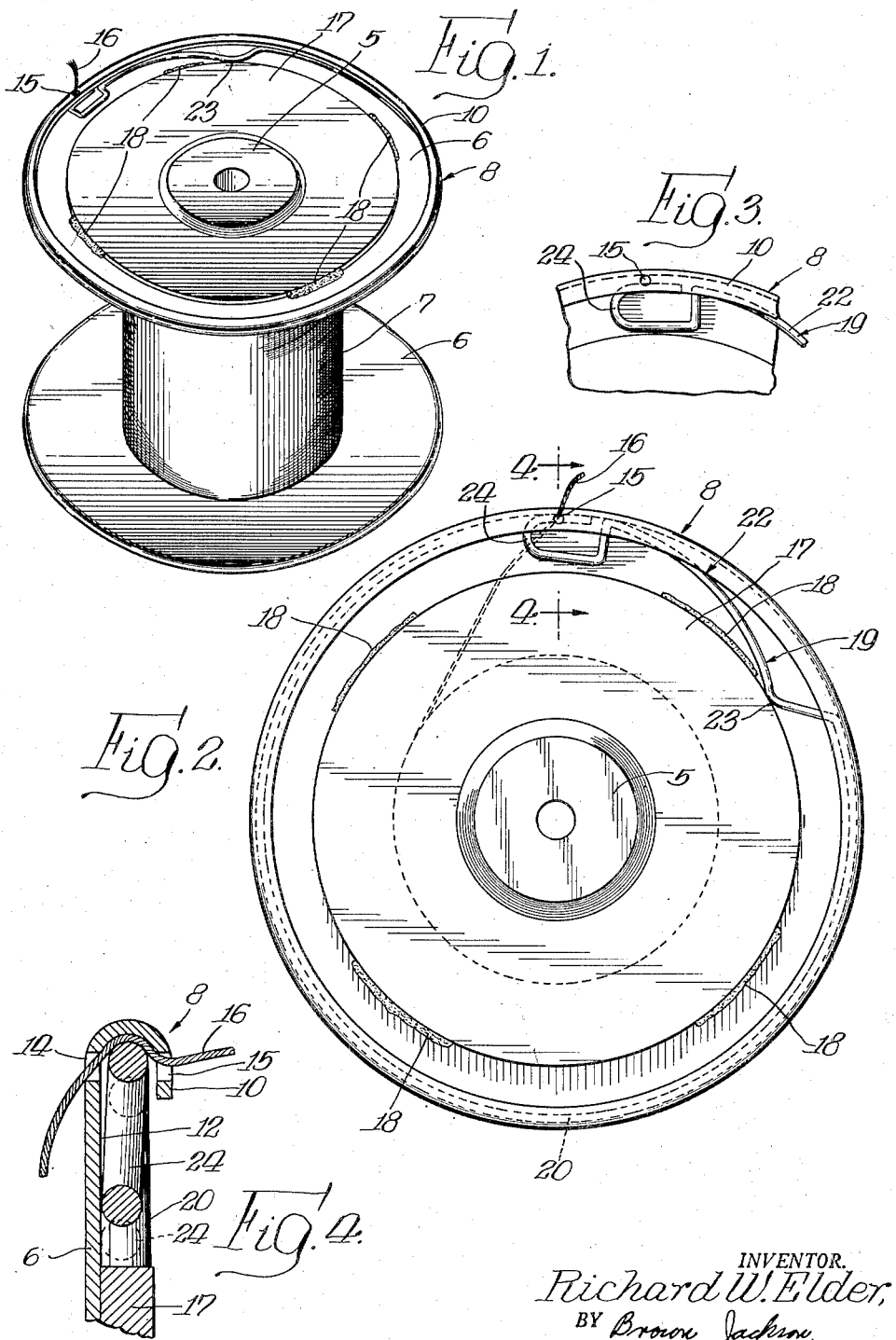

2,583,933

UNITED STATES PATENT OFFICE 2,583,933

SPOOL AND FASTENING MEANS THEREFOR

Richard W. Elder, Niles, Mich., assignor to National-Standard Company, Niles, Mich., a corporation of Michigan Application February 26, 1949, Serial No. 78,574

6 Claims. (Cl. 242—125)

My present invention relates to an improvement in a spool of a character adapted to have wire rope, cord or the like wound thereon, and more particularly to fastening means embodied with the spool to secure the free end of the material wound thereon.

It is the present practice in many instances in the shipment of spools wound with material of the character indicated to loop the last full turn of the material and tie a knot therein to retain the material on the spool. For example, in the transporting of wire rope from a wire mill to a user the aforementioned customary procedure is largely followed, and by reason of this practice, a length of rope of about three feet must be severed from the free end, in the conventional sizes of spools used for such purpose, to eliminate the tied knot which in many instances cannot be straightened sufficiently in carrying on further fabricating operations with the wire rope by the user. Such waste represents an economic loss especially by a large user of material and in the case of wire rope the loss is substantial in that many operations have already been performed by the rope mill in the manufacture of the rope.

My present invention is concerned with the provision of a spool including means for fastening the free end of the material wound thereon, and it is the primary object of my invention to provide a simple and inexpensive structure for the purpose noted.

A further object of my invention is to provide a spool having an aperture or opening in a side flange thereof into which the extreme end portion of the material wound on the spool may be disposed, together with means for engaging the end portion of the material to retain it in fixed relation to the spool.

A preferred feature of my invention resides in providing a spool having side members between which the material is wound and in which at least one of the side members is provided about its periphery with a rolled flange having one or more openings therein through which the immediate free end portion of material wound on the spool is adapted to extend, and resilient means carried by the side member of the spool which is adapted to engage resiliently the free end portion of the wound material projecting through the opening or aperture in the flange of the side member.

In the preferred form of my invention the aforementioned rolled flange extends outwardly of the side member of the spool, and the spring means preferably is in the form of a ring fitting into the rolled flange of the reel side member.

A further preferred feature resides in providing the ring spring member with a free end spring portion adjacent the opening in the spool flange member, and which spring ring member is normally biased in a direction to secure the free end of the material on the spool between it and the adjacent inner surface of the rolled flange of the side member, and further in which the free end portion of the spring member may be manually biased in a direction away from the adjacent portion of the rolled flange of the reel side member to release the free end of the material wound on the spool, or to permit the insertion of such free end in position to be fastened.

Other objects, features and advantages of my invention will appear from the detailed description.

Now in order to disclose fully my invention, I shall describe in connection with the accompanying drawings a preferred embodiment of my invention.

In the drawings:

Figure 1 is a perspective view of a spool embodying my present invention;

Figure 2 is a side elevational view of the spool of Figure 1;

Figure 3 is an enlarged detail elevational view of a portion of the side of the spool and the adjacent end portion of the spring ring member with the latter in its released position; and Figure 4 is a detail enlarged vertical sectional view taken substantially along the line 4—4 of Figure 2 looking in the direction indicated by the arrows.

Referring now to the drawing, I have shown my invention embodied in a spool or reel of a character, generally used for the transporting of wire rope which comprises a metal core or hub 5, and a pair of spaced metal side members 6—6 suitably secured at opposite ends of the hub and between which side members 6 the wire rope indicated generally at 7 is wound about the core 5.

The side members 6 as shown are provided with rolled peripheral flanges 8 preferably formed integral with the side members 6. The rolled flanges 8 each include a radially inwardly extending wall element 10 spaced outwardly of the outer surfaces 12 of the reel side members 6. The rolled flanges 8 are substantially U-shape in cross-section and define substantially annular channels at the outer peripheries of the side members 6.

As best shown in Figure 4 the side member 6 and the radially inwardly extending wall 10 there shown are provided with aligned apertures or openings 14 and 15, respectively, through which the free end portion 16 of the material wound on the spool is adapted to be extended laterally outwardly of the side member 6. The side member 6 is further formed with a raised central portion at the outer surface thereof as by means of a metal plate 17 secured to the side member 6 as by welding as indicated at 18. The raised portion formed by the plate member 17 has its periphery lying inwardly of the channel defined by the rolled flange 8.

Spring means 19 preferably in the form of a substantially annular spring ring member 20, for a major portion of its periphery, is adapted to be disposed within the channel defined by the rolled flange 8 for retaining the spring in assembled relation to the side member 6. The spring ring member 20 is formed with a free end portion indicated generally at 22 which is adapted to fulcrum on the periphery of the plate member 17 as indicated at 23 in order to provide for movement of the outer looped end 24 relative to the opening 14 and 15. The free end portion of the spring ring member is normally biased outwardly in a direction for engaging the looped end 24 with the adjacent inner surface of the rolled flange 8. In Figure 3, the looped end portion 24 is shown in retracted position to which it is adapted to be moved by suitable flexing of the free end portion 22 on fulcrum 23 to permit threading of the free end 16 of the material wound on the spool through the openings 14 and 15. Upon release of the looped end 24, the free end portion 22 of the spring returns to its initial position shown in Figure 2 to engage the free end 16 of the material wound on the spool between the looped end 24 of the spring ring member and the adjacent inner surface of the channel defined by the rolled flange 8.

It will thus be observed that I have provided a spool construction including fastening means which, after the material has been wound on the spool, provides for securing of the free end of the material to prevent its unraveling from the spool. Preferably the free end portion 22 of the spring member is normally biased in a direction to secure the free end of the material wound on the spool so that in securing or loosening the free end of the material, the free end portion 22 of the spring ring member must be biased generally radially inwardly. It is preferred that the resiliency of the spring be such so that it can be engaged manually as with the thumb of one hand for disposing the looped end 24 to its retracted position and in which position it may be held in threading of the free end 16 of the material wound on the spool through the opening 14 and 15.

It will be understood that either one or both of the spool side members 6 may be of construction above described and that a plurality of the openings 14 and 15 may be provided in either or both of the side members. In the latter event the spring ring member 20 may be adjusted circumferentially for alinement with the openings of either side member so that the free end of the material wound on the spool may be extended through such openings laterally through either side member of the spool.

While I have shown and described what I consider to be a preferred embodiment of my invention, it will be understood that various modifications and rearrangements may be made therein without departing from the spirit and scope of my invention.

I claim:
1. In combination, a spool having side members with there being aperture means extending at least through one of said side members adjacent the outer edge thereof through which the free end portion of material adapted to be wound on said spool between said side members is adapted to extend, and spring means lying in a plane parallel to and carried by said one side member, said spring means having a free end portion normally biased for movement outwardly toward the edge of said one side member to engage the free end portion of said material with said one side member.

2. In combination, a spool having side members between which material is adapted to be wound on the spool with there being aperture means in at least one of said side members adjacent the outer edge thereof through which the free end portion of the material wound on the spool is adapted to be extended, and a spring ring member lying in a plane parallel to and carried by said one side member, said spring ring member having a free end portion disposed adjacent the aperture means in said side member normally biased outwardly toward the edge of said one side member to engage the free end portion of the material between said free end portion of said spring ring member and the said adjacent edge portion of said one side member.

3. In combination, a spool having side members in which at least one of said side members is provided with an outwardly disposed rolled peripheral flange substantially U-shaped in cross-section, said one side member and said peripheral flange having aperture means extending transversely thereof through which the free end portion of material wound on said spool is adapted to be extended laterally outwardly of said one side member adjacent the outer edge thereof, and a spring ring member mounted on said one side member in said rolled flange and having a free end portion disposed at said aperture means in said one side member adapted for engaging the said free end portion of said material between it and the adjacent inner surface portion of said rolled flange.

4. In combination, a spool having side members between which material is adapted to be wound on the spool and in which at least one of said side members is provided with a peripheral flange extending radially inwardly and spaced outwardly of the outer surface of said one side member to form a substantially annular channel therewith, said one side member and said peripheral flange having aligned openings through which the free end portion of the material wound on said spool is adapted to be extended, said one side member having a raised portion at the outer surface thereof with the periphery of said raised portion lying inwardly of said annular channel, and a spring ring member disposed in said annular channel of said one side member, said spring ring member having a free end portion fulcrumed on the periphery of said raised portion and disposed at the openings of said one side member and said peripheral flange, whereby said free end portion of said spring ring member is adapted to engage the free end portion of the material wound on the spool with the adjacent inner surface portion of the channel defined by said one side member and said peripheral flange.

5. Fastening means for fastening the free end of material wound on a spool or the like having side members between which the material is adapted to be wound comprising, flange means at the outer edge of one of the side members of the spool and having aperture means extending transversely thereof through which the free end portion of the material wound on the spool is adapted to be extended laterally outwardly of said one side member, and spring means adapted to be carried by said one side member and having a portion disposed adjacent said aperture means and normally biased outwardly toward the outer edge of said one side member for engaging the free end portion of the material wound on the spool between it and said flange means.

6. The fastening means of claim 5 characterized by the flange means forming a substantially annular channel at the outer edge of said one side member, and in which the spring means comprises a spring ring member disposed in the said annular channel.

RICHARD W. ELDER.

REFERENCES CITED

The following references are of record in the file of this patent:

UNITED STATES PATENTS

| Number | Name | Date |
|---|---|---|
| 1,095,723 | Frisoli | May 5, 1914 |
| 1,274,776 | Preissner | Aug. 6, 1918 |
| 1,421,933 | Fulda | July 4, 1922 |
| 1,443,533 | Hall et al. | Jan. 30, 1923 |
| 2,107,530 | Goldberg | Feb. 8, 1938 |
| 2,421,256 | Galford | May 27, 1947 |
| 2,501,596 | Denny | Mar. 21, 1950 |

FOREIGN PATENTS

| Number | Country | Date |
|---|---|---|
| 252,367 | Switzerland | Oct. 1, 1948 |
| 476,785 | Great Britain | Dec. 15, 1937 |